(12) United States Patent
Alhatim

(10) Patent No.: US 9,297,334 B2
(45) Date of Patent: Mar. 29, 2016

(54) EXHAUST NOZZLE OF A GAS TURBINE ENGINE

(75) Inventor: Omair M. Alhatim, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 842 days.

(21) Appl. No.: 13/480,854

(22) Filed: May 25, 2012

(65) Prior Publication Data
US 2013/0313333 A1    Nov. 28, 2013

(51) Int. Cl.
  *F02K 1/28*   (2006.01)
  *F02K 1/46*   (2006.01)
  *F02K 1/30*   (2006.01)

(52) U.S. Cl.
  CPC ... *F02K 1/30* (2013.01); *F02K 1/28* (2013.01); *F02K 1/46* (2013.01)

(58) Field of Classification Search
  CPC ............ F02K 1/28; F02K 1/34; F02K 1/386; F02K 1/40; F02K 1/46; F02K 1/50
  USPC ........................................ 60/263, 770, 39.5
  See application file for complete search history.

(56) References Cited

U.S. PATENT DOCUMENTS

| | | | | |
|---|---|---|---|---|
| 2,952,123 A * | 9/1960 | Rich | .......................... | F02K 1/15 239/265.39 |
| 3,374,954 A * | 3/1968 | Card | .......................... | F02K 9/82 239/127.1 |
| 3,599,749 A * | 8/1971 | Millman | ....................... | 181/220 |
| 3,626,698 A * | 12/1971 | Baum | ....................... | F02K 7/18 60/207 |
| 3,641,766 A * | 2/1972 | Uehling | ..................... | F02C 3/06 239/265.17 |
| 3,711,013 A * | 1/1973 | Tontini | ....................... | F02K 1/28 181/220 |
| 3,739,984 A * | 6/1973 | Tontini | ..................... | F02K 1/002 181/220 |
| 4,132,068 A | 1/1979 | Johnston | | |
| 4,175,640 A * | 11/1979 | Birch | ....................... | F02K 1/386 181/213 |
| 4,389,842 A * | 6/1983 | Behnert | .................. | F02B 37/00 60/804 |
| 4,961,312 A * | 10/1990 | Simmons | ................. | F02C 7/18 60/204 |
| 5,221,048 A | 6/1993 | Lair | | |
| 5,664,415 A * | 9/1997 | Terrier | ..................... | F02K 1/28 60/204 |
| 5,694,767 A * | 12/1997 | Vdoviak | .................... | F02K 3/10 60/226.3 |
| 5,706,650 A * | 1/1998 | Thayer | .................... | F02K 1/008 239/265.17 |
| 5,826,794 A | 10/1998 | Rudolph | | |
| 5,947,412 A * | 9/1999 | Berman | .................... | B64C 7/02 239/265.17 |
| 6,112,512 A | 9/2000 | Miller et al. | | |
| 6,640,537 B2 | 11/2003 | Tse | | |
| 6,662,546 B1 * | 12/2003 | Giffin, III | .................. | F02C 7/04 342/4 |

(Continued)

OTHER PUBLICATIONS

Ikaza, D., "Thrust Vectoring Nozzle for Modern Military Aircraft", RTO AVT Symposium, May 8-11, 2000, 12 pages.

*Primary Examiner* — William H Rodriguez
*Assistant Examiner* — Eric Linderman
(74) *Attorney, Agent, or Firm* — Andrew M. Calderon; Roberts, Mlotkowski, Safran & Cole PC

(57) ABSTRACT

Systems and methods for influencing thrust of a gas turbine engine are disclosed. A system includes a plurality of pipes positioned at an exhaust nozzle of the gas turbine engine. Each one of the plurality of pipes includes: an inlet inside the exhaust nozzle; an outlet inside the exhaust nozzle; and an intermediate portion outside the exhaust nozzle.

19 Claims, 5 Drawing Sheets

(56) References Cited

U.S. PATENT DOCUMENTS

| | | | | |
|---|---|---|---|---|
| 6,679,048 B1* | 1/2004 | Lee | ................ | F02K 1/002 239/265.23 |
| 6,751,944 B2* | 6/2004 | Lair | ................ | 60/226.3 |
| 6,966,175 B2* | 11/2005 | Lair | ................ | 60/226.1 |
| 7,246,481 B2* | 7/2007 | Gutmark | ................ | F02K 1/48 181/213 |
| 7,481,038 B2 | 1/2009 | Blozy et al. | | |
| 8,020,368 B2* | 9/2011 | Bonnet | ................ | F02K 1/34 181/221 |
| 8,132,756 B2* | 3/2012 | Huber | ................ | F02K 1/34 244/53 R |
| 8,820,084 B2* | 9/2014 | Smith | ................ | F02K 1/28 415/914 |
| 9,151,244 B2* | 10/2015 | Huber | ................ | B64D 33/06 |
| 2003/0145577 A1* | 8/2003 | Hunter | ................ | F02K 1/008 60/231 |
| 2006/0230744 A1* | 10/2006 | Beutin | ................ | F02K 1/006 60/231 |
| 2008/0149742 A1* | 6/2008 | Burgun et al. | ................ | 239/265.35 |
| 2010/0146932 A1 | 6/2010 | Webster | | |
| 2011/0030341 A1* | 2/2011 | Huber | ................ | F02K 1/34 60/264 |
| 2011/0042162 A1* | 2/2011 | Huber | ................ | F02K 1/34 181/220 |
| 2011/0126512 A1 | 6/2011 | Anderson | | |
| 2011/0131948 A1* | 6/2011 | Hollimon et al. | ................ | 60/232 |
| 2012/0145808 A1* | 6/2012 | Winkler et al. | ................ | 239/265.35 |

* cited by examiner

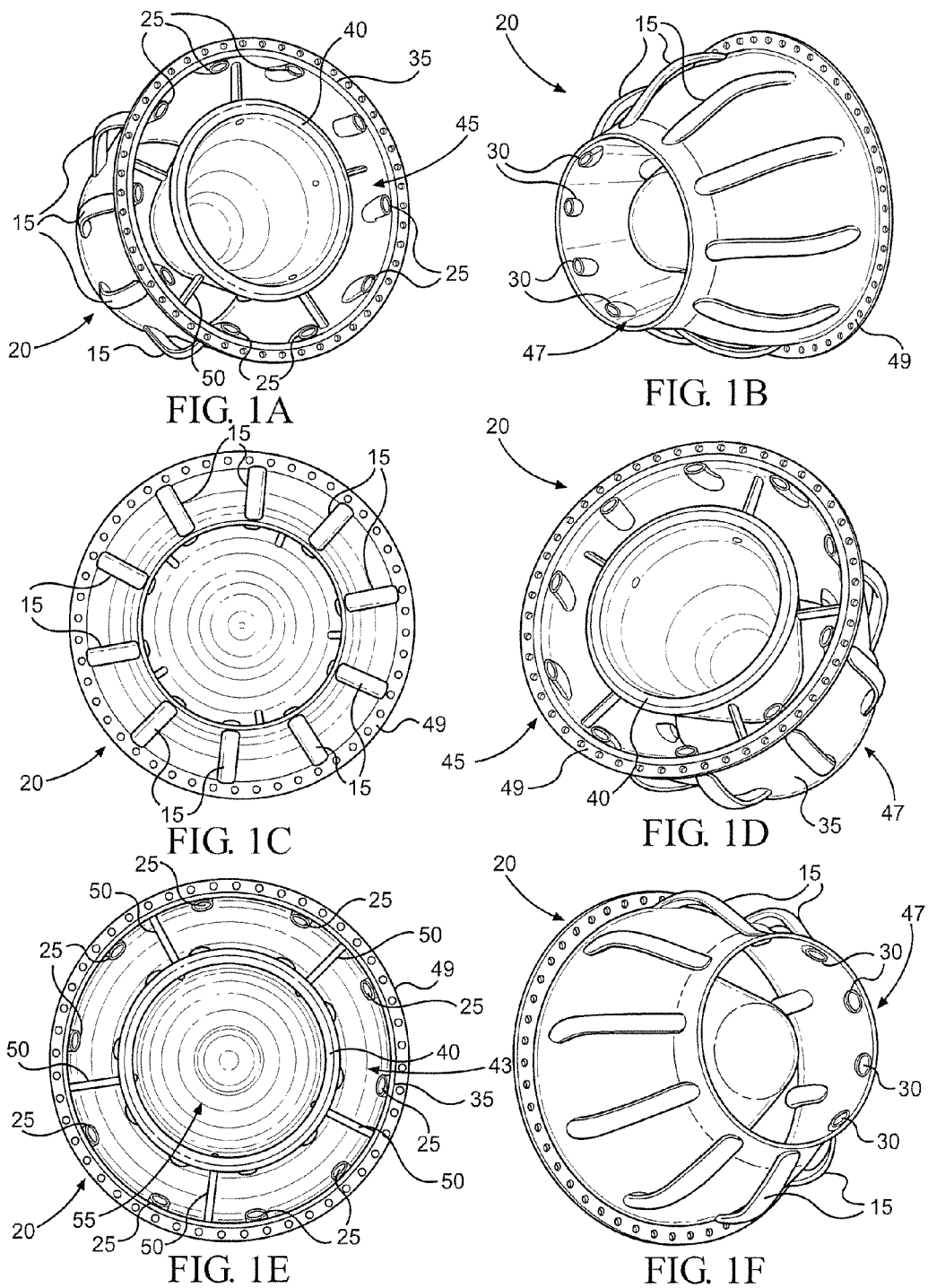

EXHAUST NOZZLE OF A GAS TURBINE ENGINE

FIELD OF THE INVENTION

The invention relates to gas turbine engines and, more particularly, to thrust optimization in gas turbine engines.

BACKGROUND OF THE INVENTION

Gas turbine engines are commonly used for propulsion elements for aircraft. Gas turbine engines include an air intake, a compressor, a combustor, a turbine, and an exhaust nozzle. During operation, air enters the engine at the air intake and is compressed by the compressor. The compressed air is mixed with fuel and ignited in the combustor, which adds energy to the system. The combustion products, e.g., hot exhaust gases, flow through the turbine which extracts energy to power the compressor. The exhaust gases leaving the turbine flow through the exhaust nozzle to provide propulsive thrust for the engine.

A jet engine is a type of gas turbine engine that derives all of its thrust from the exhaust gases exiting the exhaust nozzle. A turbofan engine is a type of gas turbine engine that derives only a portion of its thrust from the exhaust gases exiting the exhaust nozzle. Turbofan engines utilize a fan upstream of the compressor, e.g., between the air intake and the compressor. The fan is driven by the turbine and compresses the air prior to entering the compressor. A portion of the air that is compressed by the fan bypasses the compressor, combustor, and turbine. The total engine thrust is a function of both the bypass air and the exhaust gases. In high bypass ratio engines, the majority of the thrust is derived from the fan rather than the exhaust gases. In low bypass engines, more of the thrust is derived from the exhaust gases.

Many existing gas turbine engines have lower than optimal thrust. Attempts to address thrust issues include thrust vector control systems, which add complex moving parts to the exhaust section of the engine for changing the shape of the exhaust nozzle. However, thrust vector control systems add a large amount of weight to the aircraft due to the added structural elements (e.g., movable deflectors) and the actuators associated with these elements. Any increase in thrust is typically negated by the added weight, such that the overall efficiency of the engine is actually reduced. Moreover, thrust vector control systems with movable structural elements, such as movable deflectors, disadvantageously add complexity to the aircraft. Furthermore, thrust vector control systems are not appropriate for use with rockets because the thrust vector control systems do not provide sufficient control for such rockets that are put into operation according to the situation.

Accordingly, there exists a need in the art to overcome the deficiencies and limitations described hereinabove.

SUMMARY OF THE INVENTION

In a first aspect of the invention, there is a system for influencing thrust of a gas turbine engine. The system includes a plurality of pipes positioned at an exhaust nozzle of the gas turbine engine. Each one of the plurality of pipes includes: an inlet inside the exhaust nozzle; an outlet inside the exhaust nozzle; and an intermediate portion outside the exhaust nozzle.

In another aspect of the invention, there is a system including an exhaust nozzle of a gas turbine engine, the exhaust nozzle including a shroud, a cone, and an annular passage defined between the shroud and cone. The system also includes a plurality of pipes positioned at the shroud. Each one of the plurality of pipes includes: an inlet inside the annular passage; an outlet inside the annular passage; and an intermediate portion between the inlet and the outlet and outside the annular passage.

In yet another aspect of the invention, there is a method for influencing thrust of a gas turbine engine. The method includes diverting a secondary flow of exhaust gases downstream of a turbine section of the gas turbine engine. The method also includes introducing the secondary flow into a primary flow of the exhaust gases in an exhaust nozzle of the gas turbine engine. The introducing the secondary flow creates a restriction to the primary flow at an outlet of the exhaust nozzle. The restriction affects the thrust of the gas turbine engine by effectively reducing an area of the outlet of the nozzle through which the primary flow travels.

BRIEF DESCRIPTION OF THE DRAWINGS

The present invention is described in the detailed description which follows, in reference to the noted plurality of drawings by way of non-limiting examples of exemplary embodiments of the present invention.

FIGS. 1A-1F show different views of an exhaust nozzle of a gas turbine engine comprising a thrust optimization system in accordance with aspects of the invention;

DETAILED DESCRIPTION OF THE INVENTION

Figure 2A:
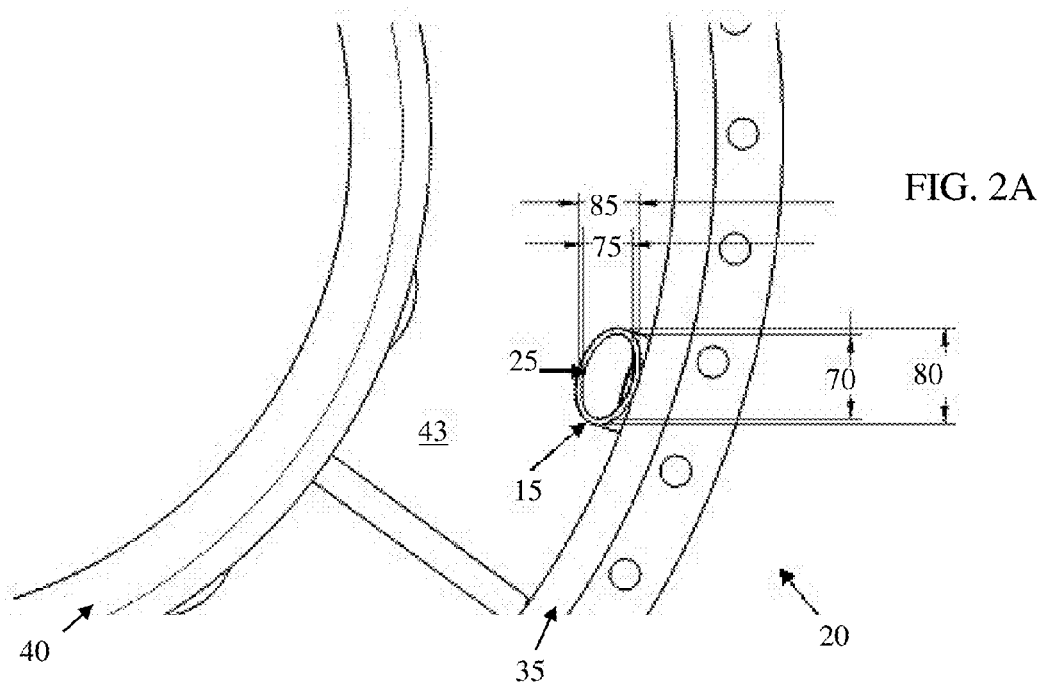
FIGS. 2A-2C show partial views of the nozzle and piping system in accordance with aspects of the invention.

The invention relates to gas turbine engines and, more particularly, to thrust optimization in gas turbine engines. According to aspects of the invention, a plurality of pipes is provided at the exhaust section of a gas turbine engine. In embodiments, the pipes divert a portion of the exhaust gases from near the turbine and inject these diverted gases into the primary flow of exhaust gases at an angle relative to the primary flow near the exhaust nozzle outlet. The injected gases create a resistance to the primary flow at the outer periphery of the exhaust nozzle opening, which increases the thrust. In this manner, implementations of the invention provide a system for optimizing the thrust of a gas turbine engine.

Implementations of the invention are particularly advantageously useful with already-constructed medium and small engines having limited capacity. Such engines can be retrofit with piping systems according to the invention to increase the thrust of the existing engine without having to purchase an entirely new engine. Implementations of the invention are also particularly advantageously useful with existing engine designs. Such designs may be modified to include aspects of the invention to increase the thrust of the engine without changing the type of engine or its dynamic mechanical qualifications.

FIGS. 1A-1F show different views of an exhaust section of a gas turbine engine comprising a thrust optimization system in accordance with aspects of the invention. In embodiments, the system comprises a plurality of pipes 15 (e.g., ducts, tubes, conduits, etc.) connected to an exhaust nozzle 20 (FIG. 1F). Each one of the pipes 15 has an inlet 25 at an upstream end of the nozzle 20 and an outlet 30 at a downstream end of the nozzle 20 (FIGS. 1A-1C, 1E, and 1F). The nozzle 20 may comprise, for example, a shroud 35 and a cone 40 that together define an annular passage 43 through which a flow of exhaust gasses passes after exiting the turbine (not shown). The nozzle 20 comprises a nozzle inlet 45 at its upstream end and a nozzle outlet 47 at its downstream end (FIG. 1D). As should be understood by those of skill in the art, the nozzle 20 can be connected to the downstream end of a turbine section of a gas turbine engine, for example by flange 49 and mechanical fasteners. The nozzle 20 may also comprise flow straighteners 50 (FIG. 1D).

As particularly shown in FIGS. 1C and 1E, the pipes 15 are equally spaced around the circumference of the nozzle 20, e.g., the plurality of pipes 15 exhibits radial symmetry with respect to a longitudinal axis 55 of the nozzle 20. Ten pipes 15 are shown in FIGS. 1A-1F, although the invention is not limited to this or any other number of pipes 15. Instead, an optimum number of pipes 15 may be determined for a particular engine based on parameters of the particular engine, such as, but not limited to, size of the engine, exhaust gas velocity, temperature, pressure, mass flow rate, etc. Moreover, the number of pipes 15 used with a particular engine may be inter-related with the cross sectional area of each pipe 15, as described in greater detail herein.

Figure 2C:
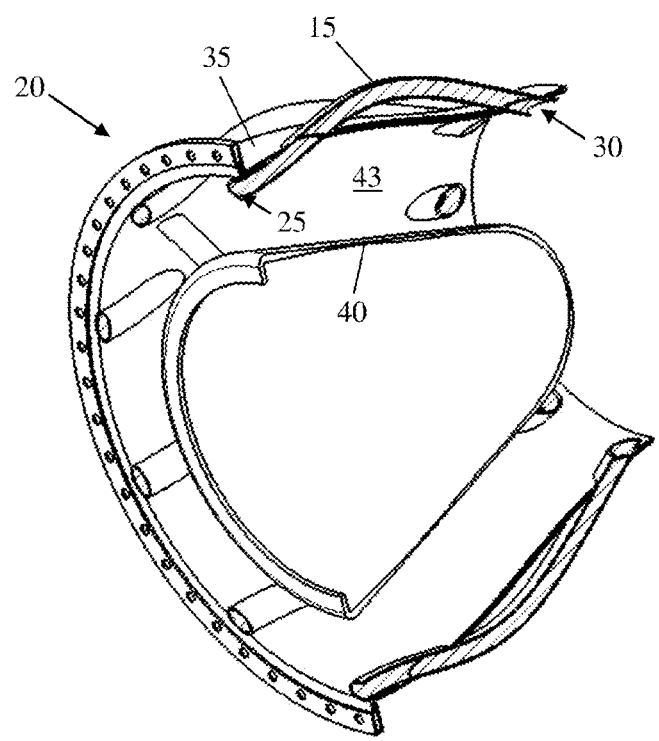
Figure 2B:
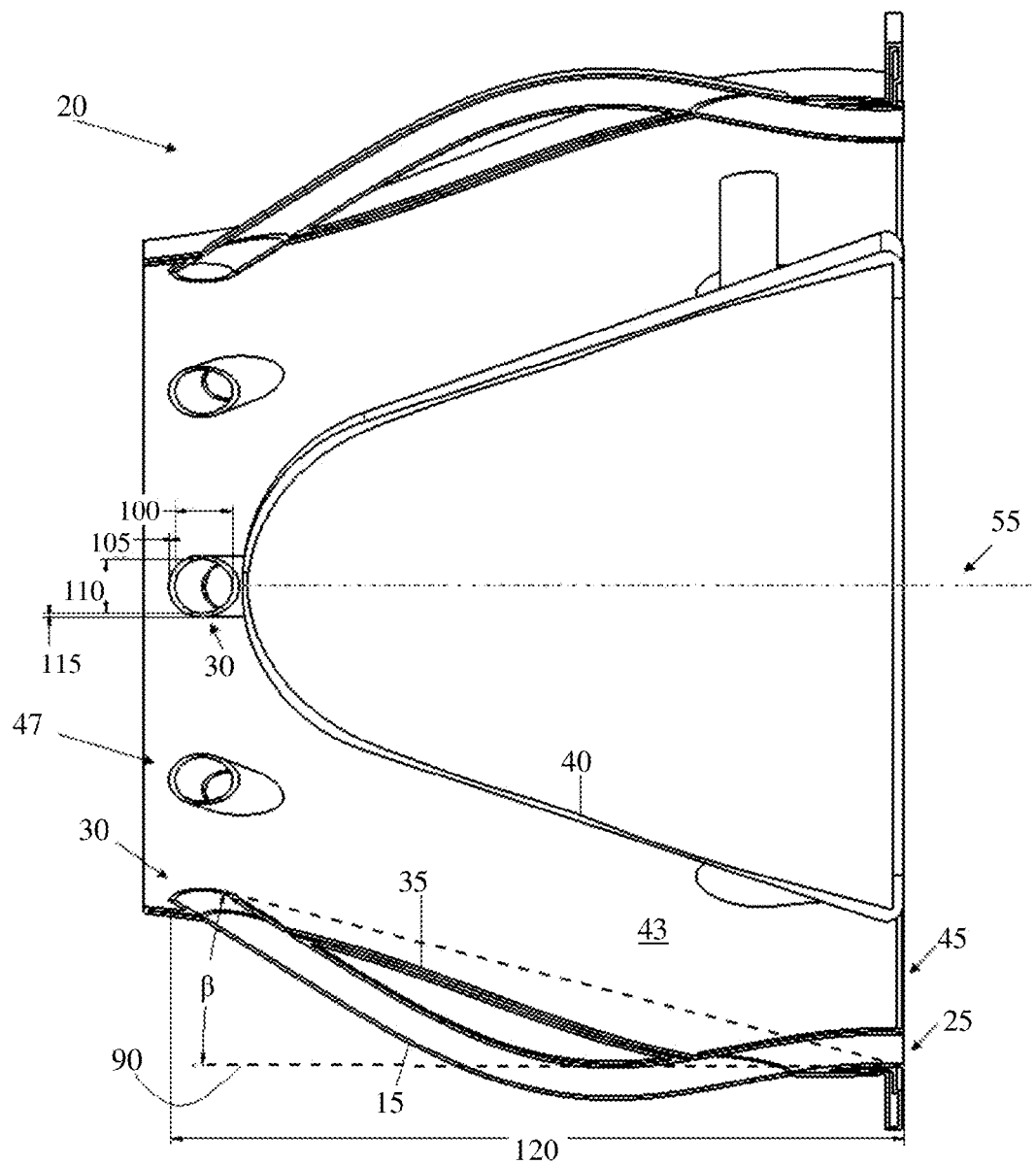

FIGS. 2A-2C show partial views of the nozzle 20 and piping system in accordance with aspects of the invention. Details of a single pipe 15 are described with reference to FIGS. 2A-2C, although it is to be understood that such details may apply to all of the pipes 15 included in the system. The pipe 15 has an inlet 25 at an upstream location and an outlet 30 at a downstream location, both being located in the annular space 43 between the shroud 35 and the cone 40.

As shown in particular in FIGS. 2A and 2C, the inlet 25 in embodiments has a substantially elliptical shape in cross section, which facilitates the entry of gases into the pipe 15 and decreases the likelihood of engine surge. For example, the inlet 25 may be defined by an annular wall of the pipe 15 having an inner surface having a substantially elliptical cross section defined by an inner major axis 70 and an inner minor axis 75. The annular wall of the pipe 15 may have an outer surface having a substantially elliptical cross section defined by an outer major axis 80 and an outer minor axis 85. In an exemplary non-limiting embodiment, the inner major axis 70 is about 15.8 mm, the inner minor axis 75 is about 8.6 mm, the outer major axis 80 is about 17.9 mm, and the outer minor axis 85 is about 10.7 mm. However, the inlet 25 is not limited to these dimensions, and the inlet 25 may be configured with any suitable size and shape in implementations of the invention.

As shown in FIG. 2B, a plane defining the inlet 25 of the pipe 15 is substantial coplanar with, or offset from and parallel to, a plane defining the inlet 45 of the nozzle 20. The inlet 25 is arranged in the annular space 43 between the shroud 35 and the cone 40. From this inlet 25, the pipe 15 extends through the shroud 35 at a first location, is arranged outside the shroud 35 for a distance, and then extends back through the shroud 35 at a second location. In the manner, the inlet 25 and outlet 30 of the pipe 15 are both within the interior of the shroud 35, while an intermediate portion of the pipe 15 between the inlet 25 and outlet 30 is located external to the shroud 35.

A plane defining the opening at the outlet 30 of the pipe 15 is arranged at an angle β relative to a line 90 that is parallel to the longitudinal central axis 55 of the nozzle 20. In embodiments, the angle β is in a range of about 13 degrees to about 14 degrees, although other angles may be used within the scope of the invention. The angle β and the bend in the pipe 15 may be configured to cause gas to flow out of the pipe 15 at an angle of about 45 degrees relative to the line 90, which results in the flow out of the outlet 30 being at an angle of about 45 degrees relative to the longitudinal central axis 55 of the nozzle 20. The bend, e.g., curvature, of the pipe 15 also enhances the pressure of the gases within the pipe 15, such that the pressure at the outlet 30 is greater than the pressure at the inlet 25.

When viewed at the particular perspective shown in FIG. 2B, the outlet 30 has a first inner dimension 100 and a first wall thickness 105 along the axis 55, and a second inner dimension 110 and a second wall thickness 115 along a line that is perpendicular to axis 55. In an exemplary non-limiting embodiment, the first inner dimension 100 is about 16.5 mm, the first wall thickness 105 is about 1.9 mm, the second inner dimension 110 is about 15.5 mm, and the second wall thickness 115 is about 0.9 mm. However, the outlet 30 is not limited to these dimensions, and the outlet 30 may be configured with any suitable size and shape in implementations of the invention.

In embodiments, the pipe 15 has a dimension 120 from the upstream end of the pipe at the inlet 25 to the downstreammost tip of the outlet 30, e.g., measured linearly and parallel to axis 55. In embodiments, the dimension 120 is in a range of about 210 mm to about 211 mm, although the invention is not limited to this value and any suitable dimension may be used within the scope of the invention.

Figure 3:
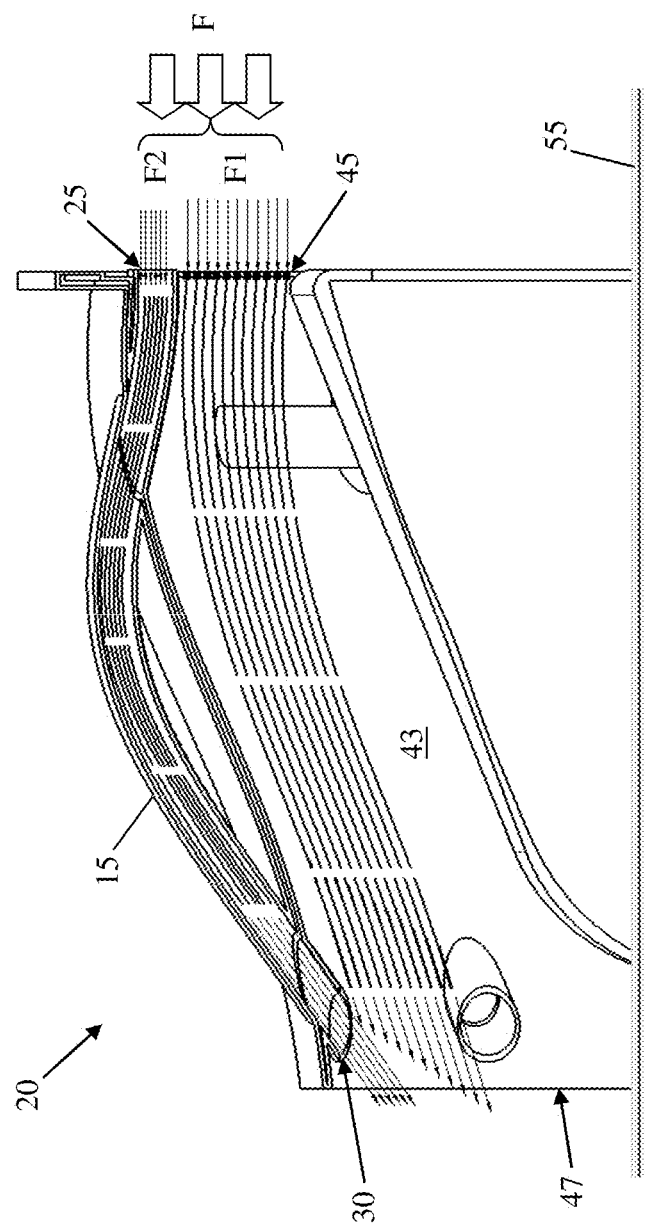
FIGS. 3 and 4A-4D show the flow of gases through the nozzle and piping system in accordance with aspects of the invention.

FIG. 3 shows a flow of gases through the nozzle 20 and pipe 15 in accordance with aspects of the invention. Flow F represents a flow of gases leaving the turbine of a gas turbine engine in a conventional manner. At the nozzle inlet 45, a primary flow F1 of the flow F travels in the annular passage 43 and a secondary flow F2 of the flow F travels into the inlet 25 of the pipe 15. The secondary flow F2 is diverted from the annular passage 43 via the pipe 15 and then introduced into the annular passage 43 at the outlet 30 of the pipe 15. As depicted by the streamlines in FIG. 3, the introduction of the secondary flow F2 into the passage 43 at a non-zero angle relative to the primary flow F1 creates a resistance to the primary flow F1 near the vicinity of the outlet 30. This resistance creates a gradient in the primary flow by decreasing the velocity of a portion of the primary flow F1 that is further away from the central axis 55 and increasing the velocity of a portion of the primary flow F1 that is closer to the central axis 55.

According to aspects of the invention, the fluid resistance caused by introducing the secondary flow F2 into the primary flow F1 effectively decreases the area of the nozzle outlet 47 and thus increases the thrust. Utilizing the pipes 15 in accordance with aspects of the invention can provide an increase of thrust of up to about 10% for some engines relative to the thrust produced by the same engine without the pipes 15, when using the same amount of fuel. In this manner, implementations of the invention may be added as a retrofit to an existing engine to increase the thrust of the engine. Implementations of the invention may be used with any type of gas turbine engine, including high bypass engines, low bypass engines, and no bypass (i.e., jet) engines.

Figure 4B:
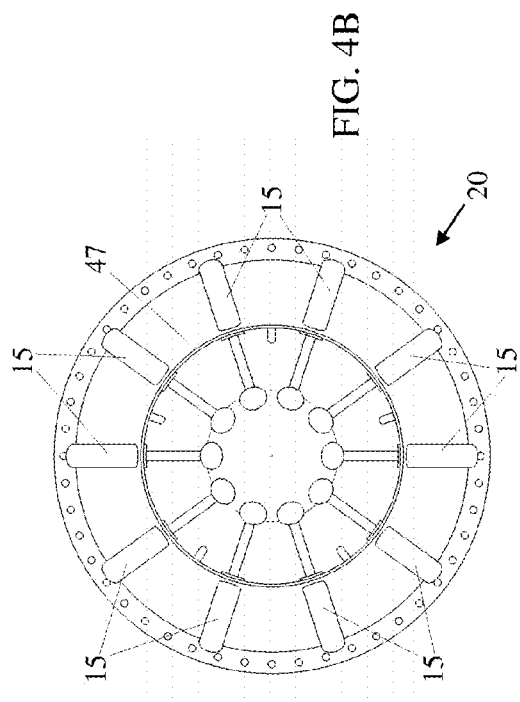
Figure 4D:
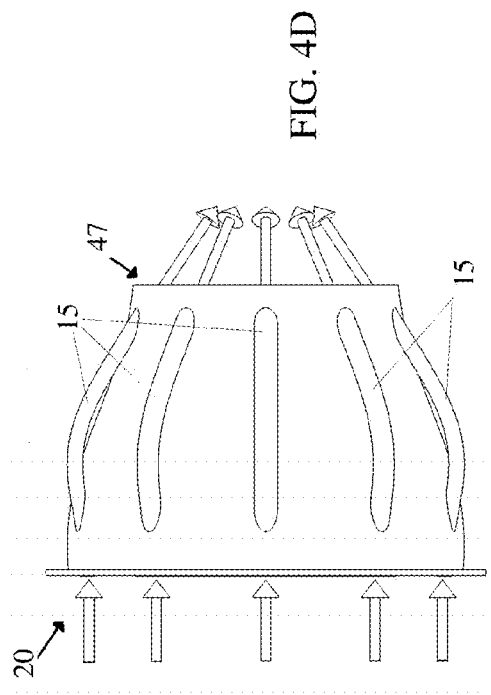
Figure 4A:
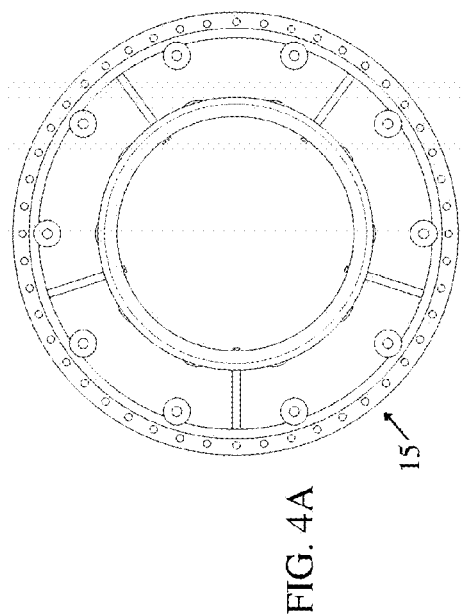
Figure 4C:
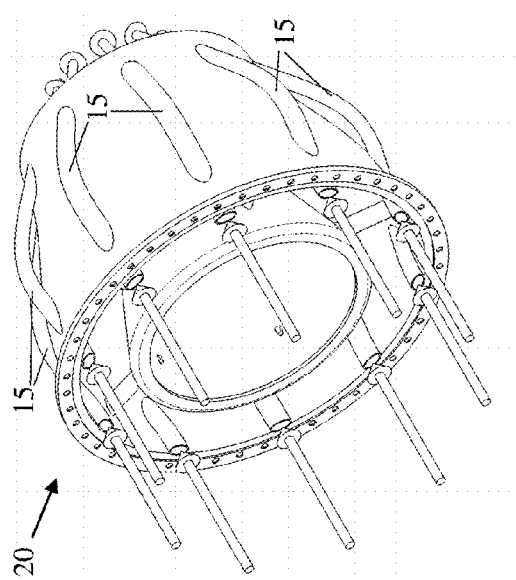

FIGS. 4A-4D further depict the flow of gases through the pipes 15 in accordance with aspects of the invention. In particular, the block arrows in FIGS. 4A-4D illustrate the flow of gases at the inlet 25 and outlet 30 of the pipes 15 in relation to the nozzle 20. The block arrows in FIGS. 4B and 4D particularly demonstrate how the secondary flow F2 restricts the area of the nozzle outlet 47. As shown in FIGS. 3 and 4D, the pipes 15 introduce the secondary flow F2 back into the passage 43 in generally the same direction as the primary flow F1 although at a non-zero angle relative to the primary flow F1. In this manner, the secondary flow F2 exits the outlet 30 traveling toward the outlet of the nozzle 20 and at an angle of about 45 degrees relative to the central axis 55. Stated differently, the secondary flow F2 is not directed into the primary flow F1 traveling normal to or upstream relative to the primary flow F1, since such a flow direction of the secondary flow F2 would create destructive interference that tends to reduce the overall thrust of the engine.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A system for influencing thrust of a gas turbine engine, comprising:
    an exhaust nozzle of the gas turbine engine, the exhaust nozzle extending between a nozzle inlet adapted to receive a flow of exhaust gasses exiting a turbine and a single nozzle outlet of the gas turbine engine; and
    a plurality of pipes positioned about the exhaust nozzle inlet and the single nozzle outlet, wherein each one of the plurality of pipes comprises:
    an inlet inside the exhaust nozzle;
    an outlet inside the exhaust nozzle; and
        an intermediate portion between the inlet and outlet and external and extending radially outward of an outer surface of the exhaust nozzle.

2. The system of claim 1, wherein:
    the inlet is at an upstream location of the exhaust nozzle; and
    the outlet is at a downstream location of the exhaust nozzle.

3. The system of claim 1, wherein each pipe diverts a portion of a flow of exhaust gases of the gas turbine engine at an upstream location and introduces the portion of the flow into the exhaust nozzle at a downstream location.

4. The system of claim 3, wherein the portion of the flow introduced at the downstream location creates a restriction to a primary flow at an outlet of the exhaust nozzle.

5. The system of claim 4, wherein the restriction effectively reduces an area of the outlet of the exhaust nozzle through which the primary flow travels.

6. The system of claim 4, wherein each one of the plurality of pipes is structured and arranged such that each pipe's outlet introduces the portion of the flow at the downstream location at a non-zero angle relative to the primary flow.

7. The system of claim 4, wherein each one of the plurality of pipes is structured and arranged such that each pipe's outlet introduces the portion of the flow at the downstream location at an angle of about 45 degrees relative to a central longitudinal axis of the exhaust nozzle.

8. The system of claim 1, wherein the inlet of each one of the plurality of pipes is located downstream of the turbine of the gas turbine engine.

9. The system of claim 1, wherein the inlet of each one of the plurality of pipes is substantially elliptical in shape.

10. The system of claim 1, wherein the plurality of pipes are arranged in radial symmetry around a central longitudinal axis of the exhaust nozzle.

11. The system of claim 1, wherein the inlet of each one of the plurality of pipes is substantially coplanar with an inlet of the exhaust nozzle.

12. A system, comprising:
    an exhaust nozzle of a gas turbine engine, the exhaust nozzle comprising a shroud extending between a nozzle inlet and a single nozzle outlet of the gas turbine engine, a cone, and an annular passage defined between the shroud and cone through which a flow of exhaust gasses passes after exiting a turbine; and
    a plurality of pipes positioned at the shroud, wherein each one of the plurality of pipes comprises:
    an inlet inside the annular passage;
    an outlet inside the annular passage; and
    an intermediate portion between the inlet and the outlet and external and extending radially outward of an outer surface of the shroud.

13. The system of claim 12, wherein the exhaust nozzle and the plurality of pipes are structured and arranged such that:
    a primary flow of the exhaust gases of the gas turbine engine travels through the annular passage; and
    a secondary flow of the exhaust gases is diverted at an upstream location, travels through the plurality of pipes, and is introduced into the annular passage at a downstream location.

14. The system of claim 13, wherein the secondary flow introduced at the downstream location creates a restriction to the primary flow at an outlet of the exhaust nozzle.

15. The system of claim 14, wherein the restriction effectively reduces an area of the outlet of the exhaust nozzle through which the primary flow travels.

16. The system of claim 14, wherein each one of the plurality of pipes is structured and arranged such that each pipe's outlet introduces the secondary flow at the downstream location at a non-zero angle relative to the primary flow.

17. The system of claim 14, wherein each one of the plurality of pipes is structured and arranged such that each pipe's outlet introduces the portion of the secondary flow at the downstream location at an angle of about 45 degrees relative a central longitudinal axis of the exhaust nozzle.

18. The system of claim 12, wherein:
    the inlet of each one of the plurality of pipes is substantially elliptical in shape;
    the inlet of each one of the plurality of pipes is substantially coplanar with an inlet of the exhaust nozzle; and
    the plurality of pipes are arranged in radial symmetry around a central longitudinal axis of the exhaust nozzle.

19. The system of claim 1, wherein the inlet of each one of the plurality of pipes has a non-circular substantially elliptical shape.

* * * * *